United States Patent [19]

Tyndall

[11] 4,099,116
[45] Jul. 4, 1978

[54] METAL DETECTOR WITH PHASE RELATED SELECTIVE DISCRIMINATION CIRCUIT

[76] Inventor: Jerry C. Tyndall, 907 Denise Ave., Coats, N.C. 27521

[21] Appl. No.: 759,916

[22] Filed: Jan. 17, 1977

[51] Int. Cl.² .............................................. G01V 3/10
[52] U.S. Cl. ...................................................... 324/3
[58] Field of Search .......................... 324/3, 4, 6, 41, 67

[56] References Cited

U.S. PATENT DOCUMENTS

| | | | |
|---|---|---|---|
| 3,065,407 | 11/1962 | Huddleston et al. | 324/6 |
| 3,676,772 | 7/1972 | Lee | 324/41 |
| 3,826,973 | 7/1974 | Pflaum | 324/6 X |
| 4,024,463 | 5/1977 | Hirschi | 324/3 |
| 4,030,026 | 6/1977 | Payne | 324/3 |

OTHER PUBLICATIONS

Leslie, Eric; How Mine Detectors Work Radio-Craft, Jul. 1946, pp. 676, 677, 721.

*Primary Examiner*—Gerard R. Strecker
*Attorney, Agent, or Firm*—Mills & Coats

[57] ABSTRACT

An improved metal detector circuit with selective discrimination for soil, mineral content or unwanted metal objects is described in which phase related adjustable feedback circuits are utilized to nullify unwanted signals in the receiver detector circuits. A mode switch connects either unwanted metallic object rejection level feedback control or ground mineral rejection controls as desired into the reception coil circuit. By phase relating the transmission and reception coils in a metal detector, all of the mineral content in the soil which produces unwanted signals in the receiver can be nulified so that a practical detector for use in high mineral content areas results.

24 Claims, 5 Drawing Figures 4,099,116

METAL DETECTOR WITH PHASE RELATED SELECTIVE DISCRIMINATION CIRCUIT

BACKGROUND OF THE INVENTION

This invention relates to metal and conductive mineral or electrically conductive object detectors in general and to inductive metal detectors in particular of the type having a transmission coil for radiating frequencies of alternating electrical signals and a reception coil for receiving the same.

Numerous metal detectors of the general type contemplated in the present invention have been developed and utilized in the past. These are comparatively expensive and complex devices which have required a relatively high degree of training and skill for effective utilization. The transmit/receive metal detectors which the prior art generally constitutes have not been easily usable in highly mineralized soil since the detectors became inoperative or difficult to use in that the pick-up coil, when it was placed in close proximity to the ground, would produce no usable signal. If the detector was retuned, a capability present in some of the prior art, then when the detector head was close to the ground a signal from desired metal objects could be detected but if the head was allowed to move up or down in relationship to the ground, a signal would be produced that would fluctuate with the head motion which made the use of such detectors very difficult and unsatisfactory.

The cause of this difficulty is that when magnetite and other conductive minerals in the soil enter the radiated electromagnetic field from the transmit coil two things happen. First, the amplitude of the received signal in the received coil changes because of mutual coupling between the coil and the conductive minerals. Secondly, the phase of the signal in the received coil changes. The resulting voltage in the received circuit will be affected by both amplitude and phase changes and the net voltage will either be greater or lesser than that originally present due to the algebraic addition or subtraction of the two components of change.

The prior art devices of the type known lack tuneable ground rejection circuit means which can be adjusted to provide the desired degree of ground coupling discrimination. Some ground discrimination circuits have been utilized in the past, but these have generally been of the sort in which the audio or other user signal is turned down to a less objectional level. Alternatively, the power supply voltage operating the transmit coil was turned down to decrease the received signal level due to ground coupling. Such circuits are delicate and require continual adjustment in the field if any usable searching for hidden metallic objects is to be achieved.

A related discrimination capability found in the prior art deals with what is called "junk" discrimination. This type of discrimination refers to a nullification of signals coming from unwanted types of small metal objects. These objects can, due to electrical and inductive characteristics, be selectively excluded by returning the transmit and receive coils in a manner which eliminates signals being produced of sufficient magnitude in the receive coil to alert the operator. By a selective feedback circuit from the transmit coil to the receive coil, some prior art devices have produced a desirable so called, "junk rejection" capability. This excludes signals from unwanted objects within the given range of size and electrical characteristics. Such prior art devices have, however, lacked tuneable ground rejection and have been extremely difficult to use, especially when the desirable metal objects may be found in mineralized soils.

OBJECTS OF THE INVENTION

In light of the foregoing difficulties and short comings in the known prior art, it is an object of this invention to provide an improved metal detector arrangement in which ground discrimination circuits of an improved type are utilized.

It is another object of the present invention to provide an improved metal detector control circuit which may be operated in different modes of discrimination and rejection for eliminating unwanted signals.

SUMMARY

The foregoing and still other objects of the invention are achieved, as will be described below with relationship to an illustrative preferred embodiment of the invention, by providing adjustable, phase related controlled feedback between and transmitting coil and the receive coil for off-setting the unwanted phase and amplitude signals received in a manner which algebraically adds sufficiently to these signals to eliminate unwanted signals coupled from the ground or from unwanted junk objects. A mode selection switch determines whether unwanted metallic object rejection or ground coupling rejection circuit elements will be active at a given time.

BRIEF DESCRIPTION OF THE DRAWINGS

The preferred embodiment and some modifications of the present invention may be more fully understood and appreciated from the following detailed description together with the accompanying drawings in which:

FIG. 1b illustrates an alternative control circuit according to the present invention for inclusion in the circuit of FIG. 1a.

DETAILED DESCRIPTION

Figure 1A:
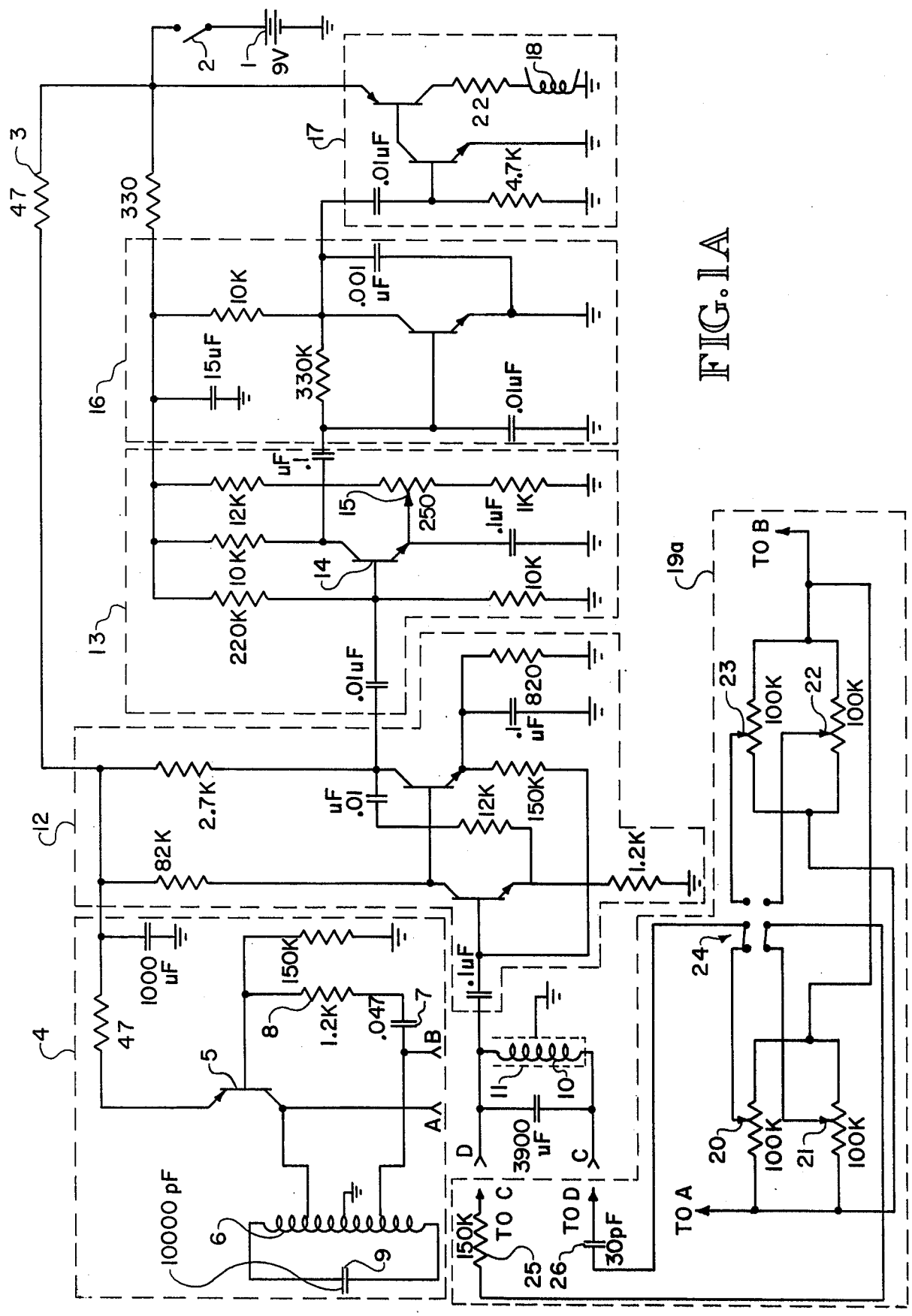
FIG. 1a is an electrical schematic diagram of a typical metal detector circuit embodying the improved features of the invention.

Turning now to FIG. 1a, the preferred embodiment of the present invention will be described in greater detail. In FIG. 1a, a negative grounded nine volt battery power supply 1 is connected in series with an on-off power switch 2 to supply electrical DC power to a variety of functional circuit units. Various electrical components illustrated have their preferred values for a specific embodiment, but the values are, as is well known in the art, matters of choice and design which do not affect the spirit or mode of operation of the present invention. The values illustrated of the present invention are illustrative only of a specific embodiment and are not intended to limit the general invention. The circuitry in FIG. 1a, with the exception of the mode control and special phase feedback circuits for junk and ground signal elimination are typical circuits of the sort well known in the art for transmit/receive metal detectors of the present type. Therefore, the basic functional blocks of the transmit/receive metal detector circuit will be described only in broad terms as they do not require any other special properties for utilization in the present invention.

In FIG. 1a, positive voltage is supplied to the input side of the transmission oscillator and transmission coil circuit within the dotted box 4. Oscillator and transmission coil 4 comprise a current switching transistor 5, the transmission coil 6, operating in a tank circuit with the power switching transistor 5, and feedback capacitance and resistance elements 7 and 8 which vary the base current to transistor 5 to turn it on and off at the resonant frequency of the circuit as established by the tank circuit coil 6, the RC circuit of capacitor 7 and resistor 8, and by the load capacitance 9 connected across the transmit coil L1. The specifics of transmission coil, other than the fact that it is a typical center tapped and grounded coil, will be described in a table below at a later time.

Electromagnetic signals radiated by coil 6 when it is operating interact with the metallic objects and ore and with the receive coil 10 (which may be shielded with a Faraday Shield 11). Coil 10 may be of either the center tapped type as shown, or an end tapped design shown in FIG. 3. Pick-up coil 10 has specific characteristics to be given later. Pick-up coil 10 (or receive coil 10 as it may be called) is connected to, and forms a part of, the overall detector circuit and is utilized for providing an unamplified input signal to the input of a RF preamplifier circuit indicated within dotted box 12 of FIG. 1a. The RF preamplifier illustrated in box 12 is a typical two-stage transistor amplifier having its output at the collector of the second stage transistor as shown. The specific details of the RF preamplifier in box 12 need not be described in greater detail than that given by FIG. 1a since its construction and operation will be matters well known to those skilled in the art. The output of the RF preamplifier is applied to the input of a threshold detection circuit within dotted box 13 which comprises a triggering detector transistor 14 whose turn on level is set through the audio setting potentiometer 15 to set the amount of signal required before transistor 14 will turn on. The output of transistor 14, as adjusted by the audio level set potentiometer 15, is applied at the input of a high gain amplifier circuit within dotted box 16 as shown. The preferred output indicator utilized in the present invention, and in much of the prior art, comprises an 8-ohm speaker or earphone connected to receive the output from the high gain amplifier after further amplification in an audio amplifier. The audio amplifier is schematically illustrated in dotted box 17 and includes the output speaker or earphone 18 as shown. Again, the specific details of audio amplifier 17, high gain amplifier 16 and various components included in the circuit are well known and are of typical design utilized in the prior art and, therefore, need no further description.

So much of the circuit as has been described in FIG. 1a up until now is generally within the prior art, with certain exceptions to be noted below, and the circuit will operate, although in a cumbersome and difficult to use fashion, but it constitutes a completed transmit/receive metal detector circuit of the type generally utilized in the prior art. Specific additions and modifications to the circuit are contemplated in the preferred embodiment of the present invention as will now be described in further detail.

The phase related feedback adjusting circuit illustrated within dotted box 19 and including the connections at points A, B, C and D in FIG. 1a constitutes a major modification required in the preferred embodiment of the present invention. In dotted box 19 one phase of the high frequency output signal of the transmission oscillator in box 4 is connected from the input to the transmission coil 6 by the line designated A to the level setting adjustment potentiometers 20 and 21 as well as to potentiometers 22 and 23. The other ends of potentiometers 20 through 23 are connected to the opposite phase by a lead ending in designation B back to the other end of transmission coil 6 as shown. It will thus be seen that potentiometers 20 through 23 are effectively connected in parallel directly across the input to transmission coil 6 and thus signals in them will be in phase with the transmitted signal from one phase of coil 6. The resistance utilized in potentiometers 20 through 23 is quite large with relationship to the impedance of the transmitting coil circuit and, therefore, very little bleed off or dissipation of oscillator power occurs through the potentiometers. The center tap or slider of each of the potentiometers is adjustable as shown and serves to pick off an adjustable voltage level portion of the transmitted signal which is applied to one or another of a set of contacts in the double pole double throw mode control switch 24 as illustrated. The output from the movable blades or center poles of mode control switch 24 are applied, respectively, to a high resistance or to a capacitance. The capacitance is chosen to present an AC impedance approximately equal to the resistance to the alternate ends of the signal receive coil 10. The connections are through leads terminating in deisgnations C and D as shown. It will be observed that a portion of one phase of the transmit oscillator output signal can be applied through respective potentiometers 20 and 21 or 22 and 23 through a resistance 25 and a capacitance 26 directly into the input of the receive coil 10. As will be immediately appreciated by those skilled in the art, the use of a RC input to both ends of the reception coil 10 makes it possible to adjust both phase and amplitude of the voltage generated in coil 10 from the feedback path coming from the transmit oscillator through leads A and B. The particular set of potentiometers 20 and or first occurrence 21 or 22 and 23 which may be connected operatively into the inputs C and D of the RF pick-up coil 10 are selected by the movable blades of the mode control switch 24. By this means, the specific settings of potentiometers 20 and 21, for example, may be utilized to select levels of feedback in one phase and amplitude which will effectively nullify junk or trash metal objects in the soil in a manner known in the art, and the settings of the potentiometers 20 and 21 may be preserved unchanged. Mode control switch 24 can be flipped to its opposite position and feed back signals of the opposite phase can be connected directly to the circuit potentiometers 22 and 23 which may be adjusted according to the present invention, to eliminate unwanted signals coupled into the transmit coil by magnetite or other mineral content in the soil.

As will be instantly appreciated, the control circuitry within dotted box 19 enables an instantaneous readjustment of the receive circuit to account for either junk and trash metal discrimination of iron ore and mineral discrimination at preset levels determined by the setting of the respective potentiometers. Typically, a given potentiometer, for example, a junk set potentiometer 20, will be turned up range with the mode control switch 24 switched to connect the potentiometer to either resistance 25 or capacitance 26. It is irrelevant whether the resistance or capacitance is connected to the specific potentiometer 20 or 21. The control on potentiometer 20 will be turned until an audio signal is generated in input 18. Then the rejection level potentiometer 21 will be turned up scale to at or near the desired level of phase shift to account for junk material which is desired to discriminate against. This will also have the effect of producing an extremely loud audio signal so that it will be necessary to turn the junk set potentiometer 20 slightly down scale until the input signal falls in amplitude below the threshold in the threshold detector circuit 13. Having made these adjustment, potentiometers 20 and 21 may be left set at their levels and mode control switch 24 can be flipped to the ground rejection mode which will connect potentiometers 22 and 23 into the circuit. Potentiometers 22 and 23 may be adjusted in a manner analogous to that of potentiometers 20 and 21, but for the purpose of nullifying the signals produced by ore bearing soils. For normal operation, all of the potentiometers can be set at or near their center range. For purposes of description, the controls can be set, in the normal mode, for a 135° phase shift with reference to the cold end of transmit coil 6. The junk and trash metal detector discrimination controls 20 and 21 can be set for a 200° approximate phase shift in the pick-up coil 10 with reference to the cold end of the transmit coil 6. For ground effect discrimination, the control potentiometers 22 and 23 can be set for a 55° phase shift with reference to the cold end of the transmit coil 6.

The degree of shift generated in pick-up coil 10 by the feedback path through potentiometers 20 and 21 or 22 and 23 as just described is an approximate shift only intended for the normal levels of discrimination for bottle caps, aluminum foil, bobby pins, etc., and low level iron ore bearing soil typically encountered. It will, of course, be obvious that different settings will be required in different locales according to the makeup of the soil and the type of trash or junk materials against which discrimination is desired. The phase of the received signal in the feedback path will be adjusted, in a typical example, to balance out the expected contribution from minerals in the soil. The phase of current in the receive coil 10 will change in proportion to the amplitude change of the signal actually received. By changing the phase by a small degree utilizing feedback from the transmission oscillator, the resulting net voltage in the receive coil will be zero or no change whenever electrically conductive mineral enters the magnetic field of coils 6 and 10. In similar manners, the degree of phase shift necessary to account for the levels to be anticipated when junk metal enters the field of coils 6 and 10 can also be set.

Figure 1B:
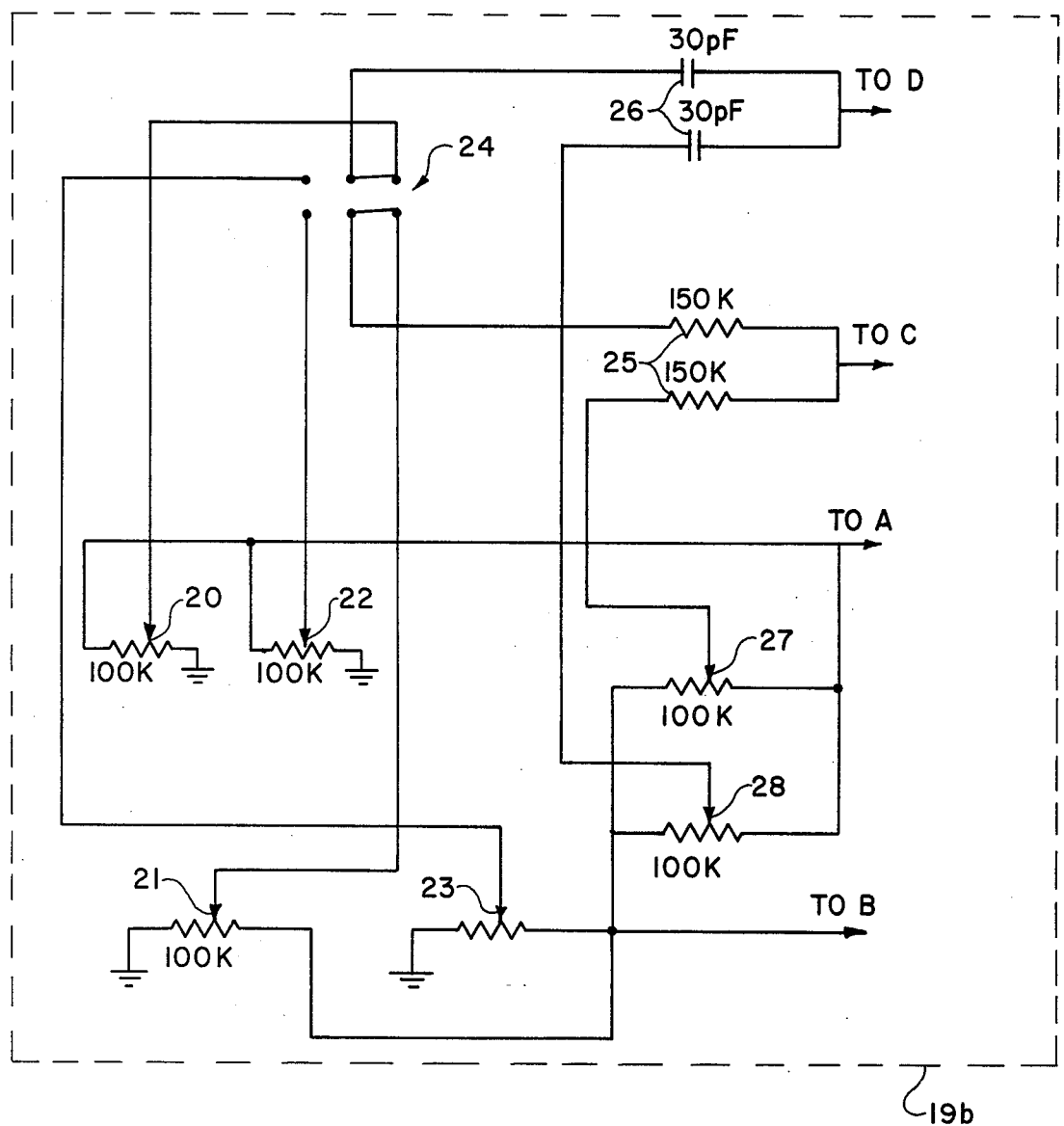

Turning to FIG. 1b, an alternative control circuit to be connected by leads at terminals A, B, C and D as shown into FIG. 1a is illustrated. The control circuit in FIG. 1b also includes two new potentiometers 27 and 28 which may be preset to initial levels and sealed within the housing or box utilized for housing the electronic components so that they may not be tampered with. The purpose of the circuit in FIG. 1b, in which it will be noted that potentiometers 20 through 23 have one end grounded, is to set the range of adjustment provided by potentiometers 20 through 23 to be operative over the full range of each potentiometer. It will be seen that in this manner, signal coming from lead A may be coupled from zero to 100 percent instead of from 100 percent of the difference between A and B as was previously illustrated in FIG. 1a. This yields a wider range of setting latitude in potentiometers 20 through 23 and is a more convenient circuit for overall utilization. It also establishes a base level of feedback for normal balancing of the system. The principles of operation are the same, however, since direct feedback from the output oscillator is coupled into the inputs of the receive coil 10 via connections C and D as shown.

Figure 2A:
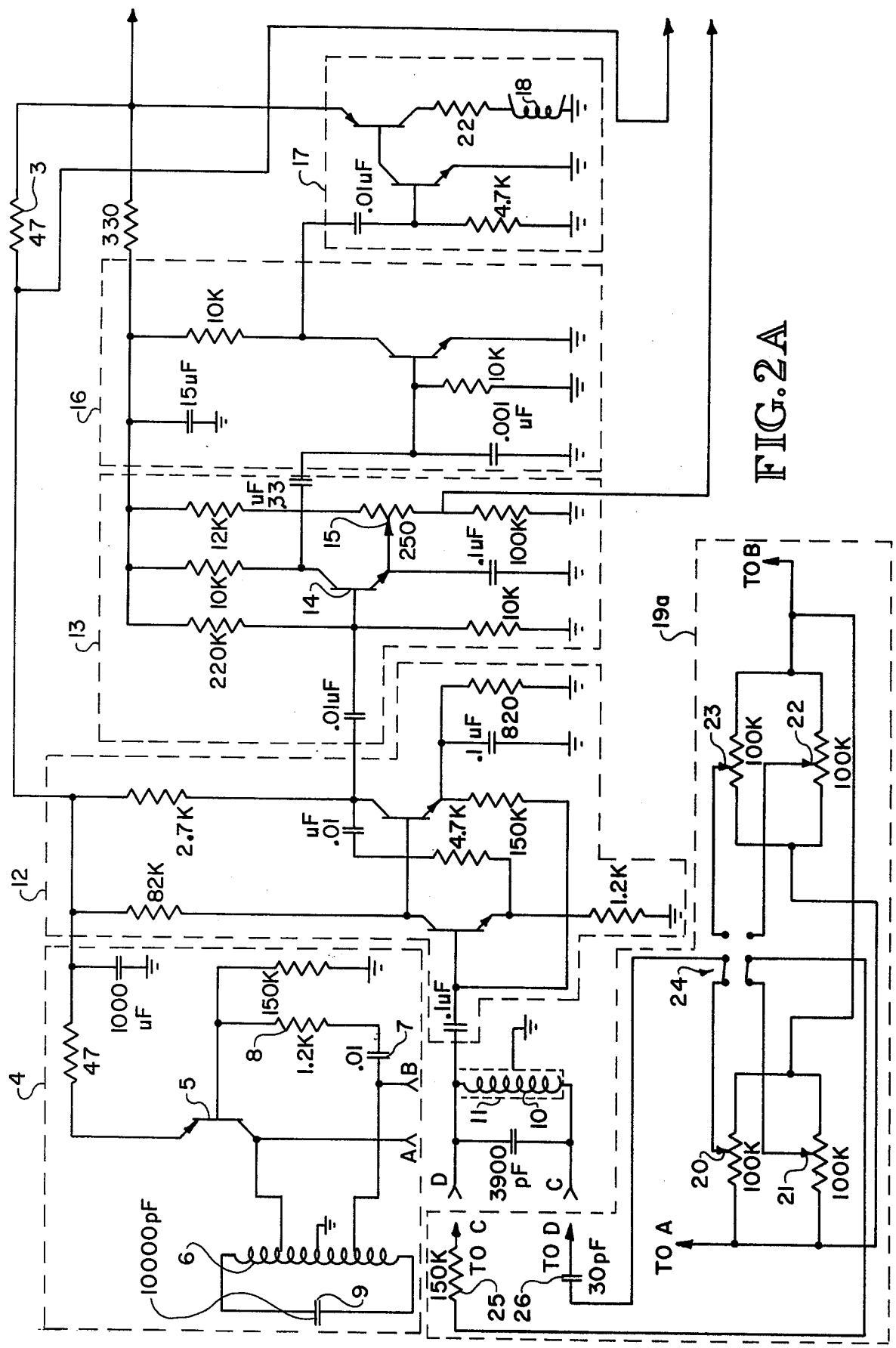
FIGS. 2a and 2b constitute an electrical schematic circuit including certain modifications for improved operation of the metal detector.
Figure 2B:
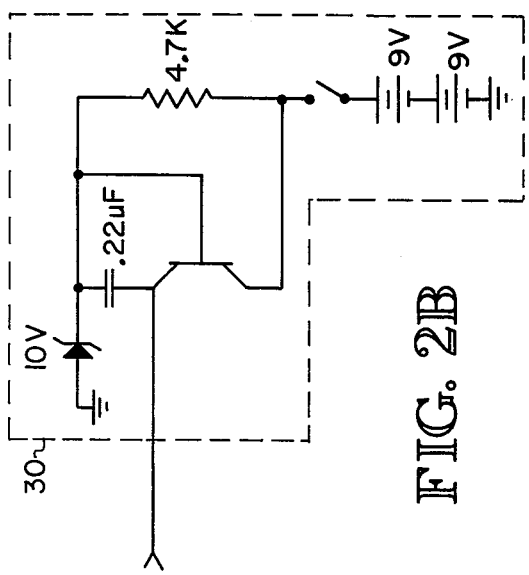

In FIGS. 2a and 2b, an audio phase shift oscillator within dotted box 29 and a regulated power supply within dotted box 30 have been added (or substituted for similar elements where they exist) in FIG. 1a. The 300 hertz audio oscillator 29 produces a 300 hertz modulation on the basic 20 kilohertz carrier signal generated in transmit oscillator 4. The reason for this is that a 20 kilohertz oscillator signal is much more effective in detecting metal objects far beneath the ground surface but does not generate a desirable audio output signal in the audio amplifier 17. Therefore, a 300 hertz audio signal generated in the oscillator 29 is impressed on the carrier signal for modulation with a 20 kilohertz transmission oscillator signal. Component values are modified in the RC circuit of the transmission oscillator by changing capacitance 7 and changes to component values in the RF preamplifier 12, threshold detector 13 and high gain amplifier 16 are also contemplated as shown to accommodate the 300 hertz audio signal which will be connected into the level detection circuit to bias the audio setting potentiometer 15 as shown.

Figure 3:
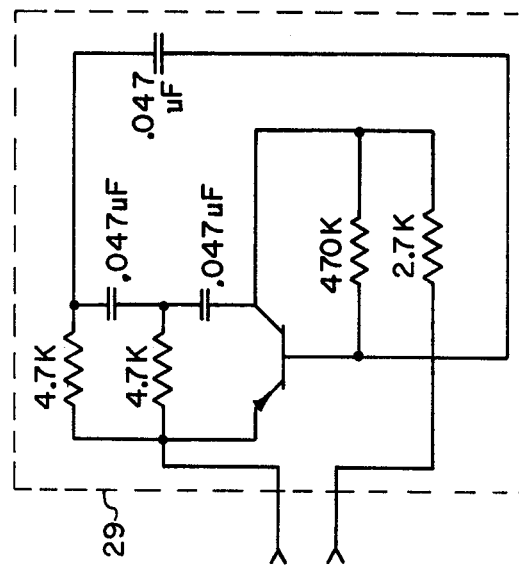
FIG. 3 is an alternative wiring diagram for a non-center tapped reception coil.

The writing configuration in FIG. 3 illustrates the use of a noncenter tapped receive coil 10 as is well known in the prior art for some types of metal detectors. FIG. 3 is illustrated only to show the mode of connecting the phase and amplitude adjusting portions of the feedback path from mode switch 24 in FIG. 1a in such a circuit configuration.

Returning now to a general description of the preferred embodiment, it is necessary to describe the transmit and receive coils, 6 and 10, respectively, in greater detail. The specific transmit and receive coils are constructed as follows:

| L1 | 42 KILOHERTZ | 20 KILOHERTZ |
| --- | --- | --- |
| Taps 1 to 2 | 16 turns #26 single coated wire | 40 turns #26 single coated wire |
| Taps 2 to 3 | 5 turns | 10 turns |
| Taps 3 to 4 | 5 turns | 10 turns |
| Taps 4 to 5 | 16 turns | 40 turns |
| L2 | 42 KILOHERTZ | 20 KILOHERTZ |
| Taps 1 to 2 | 59 turns #32 single coated wire | 136 turns #32 single coated wire |
| Taps 2 to 3 | 59 turns | 136 turns |

The transmit coil 6 (L1) in the preferred embodiment has an operative average diameter of 12.45 inches and the receive coil 10 (L2) has a diameter of 4.05 inches. The coils are wound and tapped as described in the winding tables above and are then concentrically arranged with relationship to one another in epoxy cement. During the time the cement is hardening, the coils are adjusted for a zero degree phase shift of an impressed test signal from the transmit coil as received in the receive coil. When the initial epoxy has hardened one adjustment may be made by bending or shaping the transmit coil to maintain a zero degree phase shift in the received coil of an impressed test signal. Then the entire assembly of coils 6 and 10 may be cast in hard epoxy of a slow curing type to rigidly cement the coils in zero degree phase relationship with one another. This produces an extremely ruggy and durable unit which may be occasionally impacted with objects when the unit is in service without adverse results. Lower frequency can, of course, be used with the detector of the present invention and in fact have been found to operate satisfactorily up to 100 kilohertz but the lower frequency is below 50 kilohertz and lower appear to be preferable.

Having just described my invention with reference to preferred embodiments thereof in a specific and detailed example, what is claimed is:

1. In a metal detector apparatus having inductively coupled and electrically phase and amplitude balanced transmission and reception coils and having a high frequency oscillator connected to said transmission coil and a detector amplifier and high gain and audio amplifiers, respectively, connected in series to one another and to said reception coil for amplifying radiated signals received therein from said transmission coil, the improvement comprising:

a plurality of pairs of first variable electrical resistors connected in parallel across the inputs from said high frequency oscillator to said transmission coil to receive signals of opposite phase therefrom;

a double pole double throw electrical switch means having its fixed contacts connected to the variable resistance taps of said pairs of first variable electrical resistors and having the movable blade contacts being switchable between at least two positions to selectively connect feedback signals of one or the other phase from two of said fixed contacts to the movable blade contacts of said switch;

a second electrical resistance means connected to one of said movable blade contacts of said switch means and to one end input of said reception coil in a series connection;

electrical capacitance means connected to the other of said movable blade contacts of said switch means and to the other end input of said reception coil in an electrical series connection;

said pairs of first variable resistance providing, through said switch means for selecting the phase of said feedback selected to be fed said resistance and capacitance means, respectively, variable electrical feedback input signals of opposite and variable phase and magnitude from said high frequency oscllator to said reception coil for electrically unbalancing said transmission and reception coils by a phase and magnitude amount sufficient to algebraically cancel out unwanted signals of similar but algebraically opposite phase and magnitude which may be received by said reception coil.

2. Apparatus as described in claim 1, wherein:
said first variable resistances are switchable in pairs by said switch to be connected to said second resistance means and to said capacitance means individually, said resistance and capacitance means each being connectable to only one of said variable resistances through said switch means; and
the effective electrical impedances of said second resistance and capacitance means are selected to present approximately equal AC impedances to incoming signals.

3. Apparatus as described in claim 2, wherein:
pairs of said first variable resistances are individually adjustable to different settings to account for different phases and magnitudes of undesired signals which are to be cancelled out algebraically in said reception coil; and
said pairs of first variable resistances are adjusted to electrically cancel unwanted signals from small metal objects or electrically conductive materials generally distributed in the soil, respectively, said switch means being capable of selecting which phase feedback signals and which of said pairs of said first variable resistance is actively connected through said second resistance and capacitance means, respectively, to said reception coil.

4. Apparatus as described in claim 1, wherein:
pairs of said first variable resistances are individually adjustable to different settings to account for different phases and magnitudes of undesired signals which are to be cancelled out algebraically in said reception coil; and
said pairs of first variable resistances are adjusted to electrically cancel unwanted signals from small metal objects or electrically conductive materials generally distributed in the soil, respectively, said switch means being capable of selecting which phase feedback signals and which of said pairs of said first variable resistances is actively connected through said second resistance and capacitance means, respectively, to said reception coil.

5. Apparatus as described in claim 1, wherein:
said reception coil in center tapped and grounded at said center tap.

6. Apparatus as described in claim 2, wherein:
said reception coil is center tapped and grounded at said center tap.

7. Apparatus as described in claim 3, wherein:
said reception coil is center tapped and grounded at said center tap.

8. Apparatus as described in claim 4, wherein:
said reception coil is center tapped and grounded at said center tap.

9. Apparatus as described in claim 1, wherein:
said reception coil is end grounded and end tapped.

10. Apparatus as described in claim 2, wherein:
said reception coil is end grounded and end tapped.

11. Apparatus as described in claim 3, wherein:
said reception coil is end grounded and end tapped.

12. Apparatus as described in claim 4, wherein:
said reception coil is end grounded and end tapped.

13. Apparatus as described in claim 1, and further comprising:
an additional pair of variable electrical resistances connected in parallel across the inputs from said oscillator to said transmission coil, the variable tap outputs of said additional resistances being connected through resistance and capacitance means, individually and respectively, to the inputs of said reception coil for establishing preset levels of feedback to said reception coil for establishing a base level of rejection feedback which is in addition to that provided by said first variable resistance.

14. Apparatus as described in claim 13, wherein:
said first variable resistances are switchable in pairs by said switch to be connected to said second resistance means and to said capacitor means individually, said second resistance and capacitance means each being connectable to only one of said first resistance through said switch means; and
the effective electrical impedances of said second resistance and capacitance means are selected to present approximately equal AC impedances to incoming signals.

15. Apparatus as described in claim 13, wherein:

pairs of said first variable resistances are individually adjustable to different settings to account for different phases and magnitudes of undesired signals which are to be cancelled out algebraically in said reception coil; and said pairs of first resistances are adjusted to electrically cancel unwanted signals from small metal objects or electrically conductive material generally distributed in the soil, respectively, said switch means being capable of selecting which phase feedback signals and which of said pairs is actively connected through said second resistance and capacitance means, respectively, to said reception coil, respectively.

16. Apparatus as described in claim 14, wherein:

pairs of said first variable resistances are individually adjustable to different settings to account for different phases and magnitudes of undesired signals which are to be cancelled out algebraically in said reception coil; and said pairs of first resistances are adjusted to electrically cancel unwanted signals from small metal objects or electrically conductive materials generally distributed in the soil, respectively, said switch means being capable of selecting which phase feedback signals and which of said pairs is actively connected through said resistance and capacitance means, respectively, to said reception coil.

17. Apparatus as described in claim 13, wherein:
said reception coil is center tapped and grounded at said center tap.

18. Apparatus as described in claim 14, wherein:
said reception coil is center tapped and grounded at said center tap.

19. Apparatus as described in claim 15, wherein:
said reception coil is center tapped and grounded at said center tap.

20. Apparatus as described in claim 16, wherein:
said reception coil is center tapped and grounded at said center tap.

21. Apparatus as described in claim 13, wherein:
said reception coil is end tapped and grounded at said end tap.

22. Apparatus as described in claim 14, wherein:
said reception coil is end tapped and grounded at said end tap.

23. Apparatus as described in claim 15, wherein:
said reception coil is end tapped and grounded at said end tap.

24. Apparatus as described in claim 16, wherein:
said reception coil is end tapped and grounded at said end tap.

* * * * *